United States Patent
Li et al.

(10) Patent No.: US 10,191,140 B2
(45) Date of Patent: Jan. 29, 2019

(54) LUMINAIRE IDENTIFICATION AND POSITIONING BY CONSTELLATION

(71) Applicants: Yang Li, Georgetown, MA (US); Christian Breuer, Dortmund (DE); Bernhard Siessegger, Unterschleissheim (DE)

(72) Inventors: Yang Li, Georgetown, MA (US); Christian Breuer, Dortmund (DE); Bernhard Siessegger, Unterschleissheim (DE)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 15/611,249

(22) Filed: Jun. 1, 2017

(65) Prior Publication Data

US 2018/0348338 A1 Dec. 6, 2018

(51) Int. Cl.
*F21S 8/00* (2006.01)
*G01S 5/16* (2006.01)
*G01S 1/70* (2006.01)
*H04B 10/80* (2013.01)
(Continued)

(52) U.S. Cl.
CPC ...... *G01S 5/16* (2013.01); *G01S 1/70* (2013.01); *G06F 17/30386* (2013.01); *H04B 10/116* (2013.01); *H04B 10/80* (2013.01)

(58) Field of Classification Search
CPC .. G01S 5/16; G01S 1/70; H04B 10/80; H04B 10/116; G06F 17/30386
See application file for complete search history.

(56) References Cited

U.S. PATENT DOCUMENTS

| 8,248,467 | B1 | 8/2012 | Ganick et al. |
| 2008/0310850 | A1* | 12/2008 | Pederson ........... G07C 9/00158 |
| | | | 398/135 |

(Continued)

FOREIGN PATENT DOCUMENTS

| WO | 2015001444 A1 | 1/2015 |
| WO | 2015036912 A1 | 3/2015 |

OTHER PUBLICATIONS

Lydecker, Steve, "Illuminating the In-Store Experience," Acuity Brands Indoor Positioning Services White Paper, 2015, 6 pages, available at http://hydrel.acuitybrands.com/-/media/files/acuity/solutions/services/bytelight%20services%20indoor%20positioning/indoor%20positioning%20white%20paperrevised%20110315.pdf.

(Continued)

*Primary Examiner* — Ali Alavi
(74) *Attorney, Agent, or Firm* — Yutian Ling (57) ABSTRACT

Various embodiments disclosed herein include a method for determining the position of a computing device. The method may include obtaining, by the computing device, an image of a subset of luminaries from a plurality of luminaries located in an indoor environment, in which each subset grouping of luminaires in the plurality of luminaires is uniquely identifiable. The computing device may then compare the subset of luminaires to a database storing each uniquely identifiable subset grouping of luminaires in the plurality of luminaires, in which the database includes position information for each luminaire in the plurality of luminaires, and determine the position of the computing device based on the comparison of the subset of luminaires to the database.

23 Claims, 7 Drawing Sheets

(51) Int. Cl.
*H04B 10/116* (2013.01)
*G06F 17/30* (2006.01)

(56) References Cited

U.S. PATENT DOCUMENTS

| | | | | |
|---|---|---|---|---|
| 2009/0026978 A1* | 1/2009 | Robinson | ........... | H05B 37/0245 315/294 |
| 2011/0217044 A1* | 9/2011 | Kang | ................ | H04B 10/1149 398/67 |
| 2012/0002974 A1* | 1/2012 | Schenk | .............. | H04B 10/1149 398/130 |
| 2015/0036016 A1 | 2/2015 | Jovicic | | |

OTHER PUBLICATIONS

Wright, Maury, "Philips Lighting demonstrates LED-based indoor location detection technology," LEDs Magazine, Feb. 17, 2014, 4 pages, available at http://www.ledsmagazine.com/articles/2014/02/philips-lighting-demonstrates-led-based-indoor-location-detection-technology.html.

"Camera calibration with OpenCV," OpenCV 2.4.13.2 documentation, 11 pages, available at http://docs.opencv.org/2.4/doc/tutorials/calib3d/camera_calibration/camera_calibration.html.

Groth, Edward J., "A Pattern-Matching Algorithm for Two-Dimensional Coordinate Lists," Astronomical Journal, vol. 91, No. 5, pp. 1244-1248, ISSN 0004-6256, May 1986, 5 pages.

"Real time pose estimation of a textured object," OpenCV 3.1.0 documentation, 2015, 10 pages, available at http://docs.opencv.org/3.1.0/dc/d2c/tutorial_real_time_pose.html.

Marszalek, Marcin et al., "Pattern Matching with Differential Voting and Median Transformation Derivation," Computer vision and Graphics, vol. 32, pp. 1002-1007, 2006, 6 pages.

Morrish, Ian, International Search Report and Written Opinion of the International Searching Authority for PCT/US2018/034994, Aug. 2, 2018, 10 pages, European Patent Office, Rijswijk, The Netherlands.

\* cited by examiner

LUMINAIRE IDENTIFICATION AND POSITIONING BY CONSTELLATION

FIELD OF THE DISCLOSURE

This disclosure relates to solid-state lighting (SSL), and more particularly to indoor positioning systems utilizing luminaires.

BACKGROUND

Some indoor positioning systems commonly use radio-frequency (RF) signals to facilitate navigation of buildings or structures. RF based positioning involves communication signals, such as ultra-wide band (UWB), BLUETOOTH®, ZIGBEE® and Wi-Fi signals, for exchanging navigation and/or positioning information with one or more users of the system. These systems often include several RF transmitters (e.g., a BLUETOOTH® Beacon) configured to communicate with users located in or about a building. Some indoor positioning systems also utilize light-based communication. Other indoor positioning systems may use light-based communication transmitted from luminaires to communicate positioning information to a computing device. The computing device may then determine its own position from the positioning information received from the luminaires.

SUMMARY

Various embodiments disclosed herein includes a method for determining the position of a computing device. The method may include obtaining, by the computing device, an image of a subset of luminaires from a plurality of luminaires located in an indoor environment, in which each subset grouping of luminaires in the plurality of luminaires is uniquely identifiable, comparing the subset of luminaires to a database storing each uniquely identifiable subset grouping of luminaires in the plurality of luminaires, in which the database includes position information for each luminaire in the plurality of luminaires, and determining the position of the computing device based on the comparison of the subset of luminaires to the database. In some embodiments, each subset grouping of luminaires in the plurality of luminaires may be uniquely identifiable based at least in part on a position, orientation, brightness, or color of each luminaire, or a marking on or proximate to each luminaire. In some embodiments, the database stores the brightness or color of each luminaire in the plurality of luminaires and information about the marking of each luminaire. In some embodiments, the method may further include decoding a unique identifier of a first luminaire in the subset of luminaires, the first luminaire transmitting the unique identifier via light-based communication, and determining the position of the computing device based at least in part on the unique identifier, in which the database stores the unique identifier for the first luminaire. In some embodiments, the subset of luminaires may contain at least N number of luminaires and each subset grouping of N luminaires in the plurality of luminaires is uniquely identifiable. In some embodiments, comparing the subset of luminaires to the database may include identifying a match between the subset of luminaires and one of the uniquely identifiable subset grouping of luminaires stored in the database, and obtaining the position information of each of the luminaires in the matched subset grouping of luminaires from the database, in which determining the position of the computing device is based on the position information of each of the luminaires in the matched subset grouping of luminaires. In some embodiments, determining the position of the computing device may include determining a relative position of the computing device with respect to the subset of luminaires based on the obtained image, and determining an absolute position of the computing device based on the relative position of the computing device and position information of the subset of luminaires stored in the database. In some embodiments, the absolute position of the computing device may include a three dimensional location, a pitch, a roll, and a yaw of the computing device.

Further embodiments disclosed herein include a computing device. The computing device may include an image capture device configured to obtain an image of a subset of luminaires from a plurality of luminaires located in an indoor environment, in which each subset grouping of luminaires in the plurality of luminaires is uniquely identifiable, and a processor configured to compare the subset of luminaires to a database storing each uniquely identifiable subset grouping of luminaires in the plurality of luminaires, in which the database includes position information for each luminaire in the plurality of luminaires, and determine the position of the computing device based on the comparison of the subset of luminaries to the database.

In some embodiments, each subset grouping of luminaires in the plurality of luminaires may be uniquely identifiable based at least in part on a position, orientation, brightness, or color of each luminaire, or a marking on or proximate to each luminaire. In some embodiments, the database stores the brightness or color of each luminaire in the plurality of luminaires and information about the marking of each luminaire. In some embodiments, the processor is further configured to decode a unique identifier of a first luminaire in the subset of luminaires, the first luminaire transmitting the unique identifier via light-based communication, and determine the position of the computing device based at least in part on the unique identifier, in which the database stores the unique identifier for the first luminaire. In some embodiments, the subset of luminaires may contain at least N number of luminaires and each subset grouping of N luminaires in the plurality of luminaires is uniquely identifiable. In some embodiments, the processor may be configured to compare the subset of luminaires to the database by identifying a match between the subset of luminaires and one of the uniquely identifiable subset grouping of luminaires stored in the database, and obtaining the position information of each of the luminaires in the matched subset grouping of luminaires from the database, in which determining the position of the computing device is based on the position information of each of the luminaires in the matched subset grouping of luminaires. In some embodiments, the processor may be configured to determine the position of the computing device by determining a relative position of the computing device with respect to the subset of luminaires based on the obtained image, and determining an absolute position of the computing device based on the relative position of the computing device and position information of the subset of luminaires stored in the database. In some embodiments, the absolute position of the computing device may include a three dimensional location, a pitch, a roll, and a yaw of the computing device. In some embodiments, a system may include the computing device and further includes a remote server configured to compare the subset of luminaires to the database and determine the position of the computing device, in which the computing device is further configured to transmit the image of the subset of luminaires to the remote server and receive the position of the computing device from the remote server.

Further embodiments disclosed herein include a non-transitory processor-readable storage medium having stored thereon processor-executable instructions configured to cause a processor of a computing device to perform operations including obtaining an image of a subset of luminaires from a plurality of luminaires located in an indoor environment, in which each subset grouping of luminaires in the plurality of luminaires is uniquely identifiable, comparing the subset of luminaires to a database storing each uniquely identifiable subset grouping of luminaires in the plurality of luminaires, in which the database includes position information for each luminaire in the plurality of luminaires, and determining the position of the computing device based on the comparison of the subset of luminaires to the database.

In some embodiments, each subset grouping of luminaires in the plurality of luminaires may be uniquely identifiable based at least in part on a position, orientation, brightness, or color of each luminaire, or a marking on or proximate to each luminaire. In some embodiments, the stored processor-executable instructions are configured to cause the processor to perform operations further including decoding a unique identifier of a first luminaire in the subset of luminaires, the first luminaire transmitting the unique identifier via light-based communication, and determining the position of the computing device based at least in part on the unique identifier, in which the database stores the unique identifier for the first luminaire. In some embodiments, the subset of luminaires contains at least N number of luminaires and each subset grouping of N luminaires in the plurality of luminaires is uniquely identifiable. In some embodiments, the stored processor-executable instructions are configured to cause the processor to perform operations such that comparing the subset of luminaires to the database includes identifying a match between the subset of luminaires and one of the uniquely identifiable subset grouping of luminaires stored in the database, and obtaining the position information of each of the luminaires in the matched subset grouping of luminaires from the database, in which determining the position of the computing device is based on the position information of each of the luminaires in the matched subset grouping of luminaires. In some embodiments, the stored processor-executable instructions are configured to cause the processor to perform operations such that determining the position of the computing device includes determining a relative position of the computing device with respect to the subset of luminaires based on the obtained image, and determining an absolute position of the computing device based on the relative position of the computing device and position information of the subset of luminaires stored in the database.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Some indoor positioning systems may utilize luminaires to determine the position of a computing device within an indoor environment. The luminaires may transmit light-based communication (LCom) signals encoded with information that may be used to determine the position of the computing device. For example, the LCom signals may encode position information of the luminaire, or a unique identifier that the computing device may look up in a database to determine the position of the luminaire. The computing device may receive and decode the LCom signals, and determine its own position relative to the luminaires based on the received position information.

However, not all luminaires in an indoor environment such as a building may be configured to transmit LCom signals. For example, the lights in a building may all be conventional luminaires that produce light for illuminating the building. It may still be possible for a computing device to determine its own position if the luminaires are arranged in a random or a non-repeating layout. In such a case, the computing device may capture an image of a subset of luminaires, in which the position and orientation of the luminaires in the subset are unique from any other subset of luminaires in the indoor environment. However, in many cases the luminaires in an indoor environment have a repeating layout such that subsets of luminaires are not uniquely identifiable from each other.

Thus, and in accordance with various embodiments of the present disclosure, systems and methods are disclosed for implementing an indoor positioning system regardless of whether the luminaires are configured to transmit LCom signals or have a repeating layout. The luminaires may be configured to produce a non-repeating layout by changing one or more physical and/or optical properties of the luminaires, or by adding additional luminaires. For example, one or more luminaires may be configured to emit light of slightly different brightness or color that is detectable by an image capture device of a computing device. The variations in brightness and/or color may produce a non-repeating layout of luminaires. In another example, additional luminaires may be added that break the symmetry or repeating pattern of the existing luminaires. In another example, physical markings may be added to each luminaire that break the symmetry or repeating pattern. In another example, one or more conventional luminaires may be replaced by luminaires configured to transmit LCom signals such that each uniquely identifiable subset of luminaires contains at least one LCom-enabled luminaire that transmit a unique identifier.

The computing device may use an image capture device, such as a camera or an ambient light sensor, to obtain an image of a subset of luminaires that are above the computing device (e.g., on the ceiling inside a building). The subset of luminaires may be considered a sub-constellation of the overall luminaire constellation constructed by all the luminaires in the indoor environment. The computing device may compare the subset of luminaires to a database that stores information about each uniquely identifiable subset grouping of luminaires in the indoor environment. The database may also store the position information of each luminaire in the indoor environment, and may also store additional information such as the brightness or color of each luminaire, information about markings that are located on or proximate to each luminaire, or a unique identifier that is transmitted by certain LCom-enabled luminaires. The database may be stored on the computing device, or may be stored on a remote server that the computing device is able to communicate with.

The computing device may match the subset of luminaires captured in the image to one of the unique subset groupings of luminaires stored in the database. For example, if subset groupings of luminaires are configured to be uniquely identifiable based on variations in color or brightness, the computing device may find a subset grouping of luminaires in the database that has the same relative position, orientation, and color/brightness variation as the subset of luminaires in the obtained image. If the subset groupings of luminaires are configured to be uniquely identifiable based on variations in markings or additional luminaires that break symmetry, the computing device may find a subset grouping of luminaires in the database that has the same relative position and orientation of all luminaires and/or markings as the subset of luminaires in the obtained image. If the subset groupings of luminaires are configured to be uniquely identifiable based on a unique identifier transmitted by a LCom-enabled luminaire in each subset grouping, the computing device may find a subset grouping of luminaires in the database that has the same relative position, orientation, and unique identifier as the subset of luminaires in the obtained image. The computing device may then determine its own position (relative and/or absolute) based on the position information of the matched subset grouping of luminaires stored in the database.

This approach for indoor positioning systems may reduce costs because not all the luminaires in an indoor environment have to be replaced or retrofitted to enable LCom, and the luminaires do not have to be programmed or commissioned. In addition, there is no visible flicker, issues with moving/rotating parts, reduced luminaire efficacy, or other issues associated with LCom-enabled luminaires. Furthermore, this approach may also reduce the minimum capabilities of the computing device for enabling indoor positioning. For example, the computing device may utilize either global or rolling shutter cameras to capture images, may have lower image resolution, and may have lower shutter speed and repetition rates (if the positioning occurs while the computing device is stationary). This approach is also relatively robust against external disturbances such as daylight as long as the luminaires have sufficient contrast in the obtained image.

System Architecture and Operation

Figure 1:
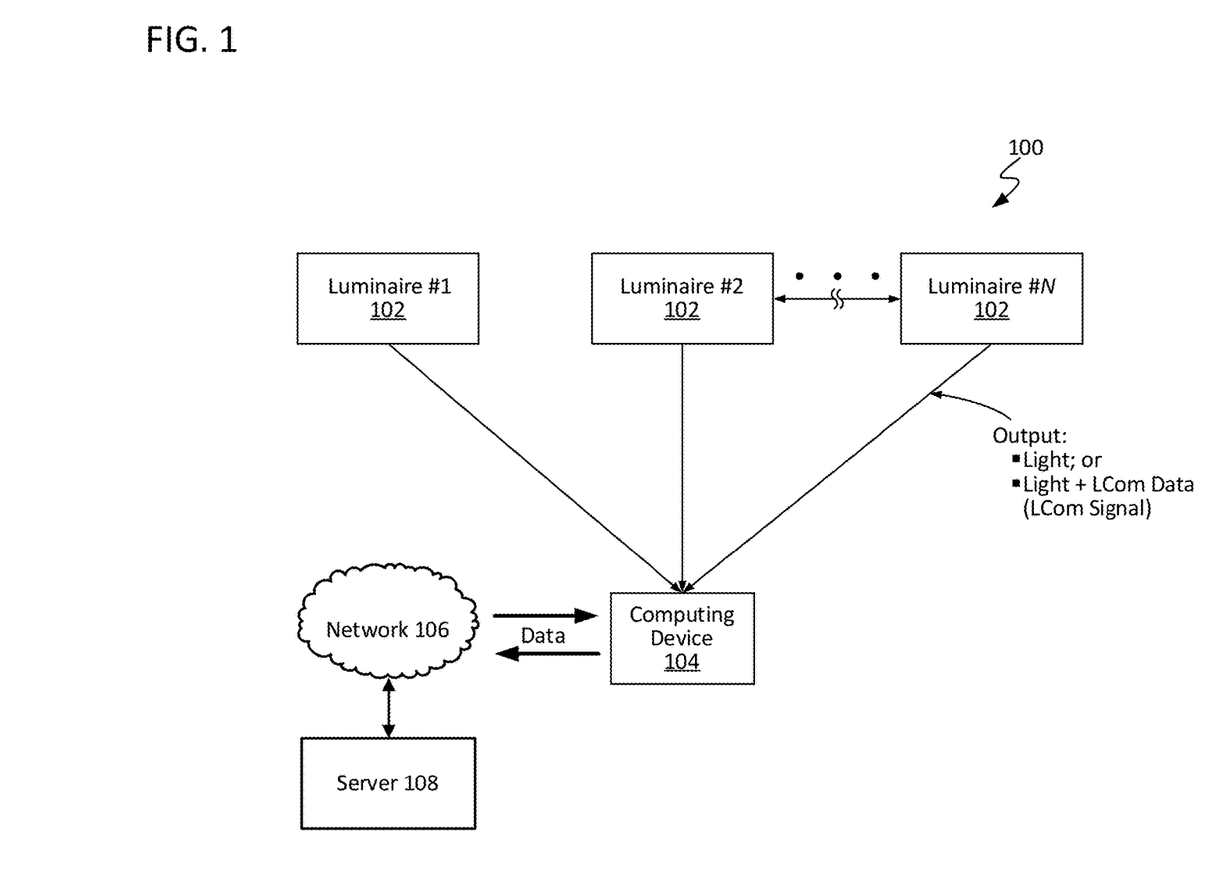
FIG. 1 is a block diagram illustrating an example indoor positioning system configured in accordance with an embodiment of the present disclosure.

FIG. 1 is a block diagram illustrating an example indoor positioning system 100 configured in accordance with an embodiment of the present disclosure. As can be seen, system 100 may include one or more luminaires 102. The luminaires 102 may emit light to illuminate the interior of an indoor environment such as a building. In some embodiments, one or more of the luminaires 102 may be configured to transmit LCom signals. The LCom signals may be visible light-based signals, or may be signals embedded in non-visible forms of electromagnetic radiation. In some cases, LCom may be provided in one direction; for instance, LCom data may be passed from a given LCom-enabled luminaire 102 (e.g., the transmitter) to a computing device 104. In some other cases, LCom may be provided in a bi-directional fashion between a given LCom-enabled luminaire 102 and the computing device 104, where both act as a transceiver device capable of transmitting and receiving.

The computing device 104 may be configured to capture an image of a subset of luminaires 102 in an indoor environment. For example, the computing device 104 may include a camera or another image capture device for capturing the image. The computing device 104 may determine its own position based on the image and a database that stores information about each luminaire 102, as described further herein. The database may be stored on the computing device 104, or may be stored on one or more remote servers 108.

The system 100 may allow for communicative coupling between the computing device 104, the network 106, and the one or more remote servers 108. The network 106 may be a wireless local area network, a wired local network, or a combination of local wired and wireless networks, and may further include access to a wide area network such as the Internet or a campus-wide network. In short, network 106 can be any communications network.

The server 108 may be any suitable computing system capable of communicating over the network 106, such as a cloud-based server computer, and may be programmed or otherwise configured to provide an LCom-related service, according to some embodiments. For example, the server 108 may store a database with positioning information about each luminaire 102. In some embodiments, the server 108 may be configured to receive an image of a subset of luminaires captured by the computing device 104, and determine the position of the computing device 104 from the image. Numerous other such configurations will be apparent in light of this disclosure.

Luminaire Layouts

Figure 2:
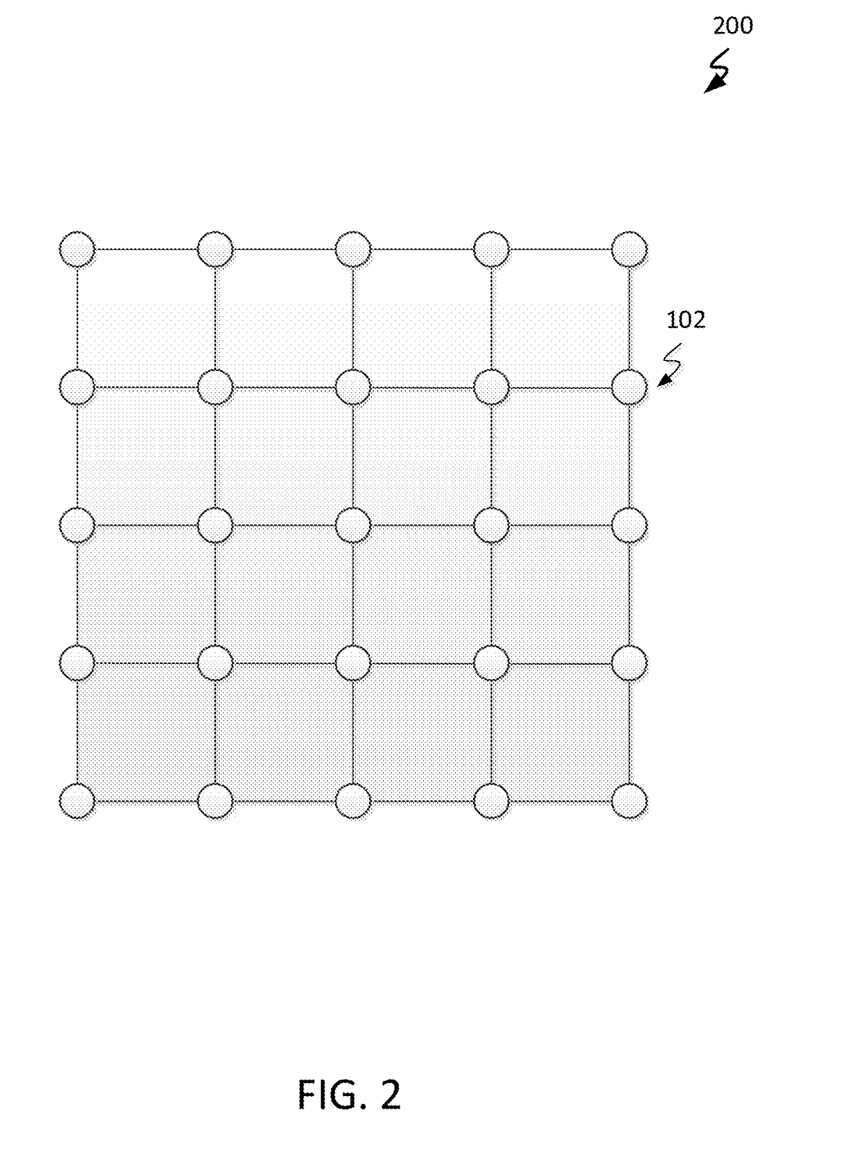
FIG. 2 is a block diagram of a plurality of luminaires in an indoor environment.

FIG. 2 illustrates a block diagram 200 of a plurality of luminaires 102 (represented by circles in FIG. 2). The plurality of luminaires may be located within a building or another indoor or partially indoor environment. As mentioned previously, if the layout of the luminaires 102 is random or in a non-repeating layout, then the luminaires 102 may be divided into subset groupings, in which each subset grouping is uniquely identifiable based on the relative position and orientation of the luminaires in each subset grouping.

However, in many indoor environments the luminaires 102 do have a repeating layout, such as illustrated in FIG. 2. In addition, the luminaires 102 may be configured to emit light of the same brightness and color. If a computing device captures an image of a subset of the luminaires 102, it cannot uniquely identify which subset of luminaires it has captured. For example, if a computing device captures an image of nine luminaires (e.g., a 3×3 matrix of luminaires), there are nine possible 3×3 matrices of luminaires as illustrated in FIG. 2. Given this uncertainty, the computing device cannot locate its own position from the image of the subset of luminaires.

Figure 3A:
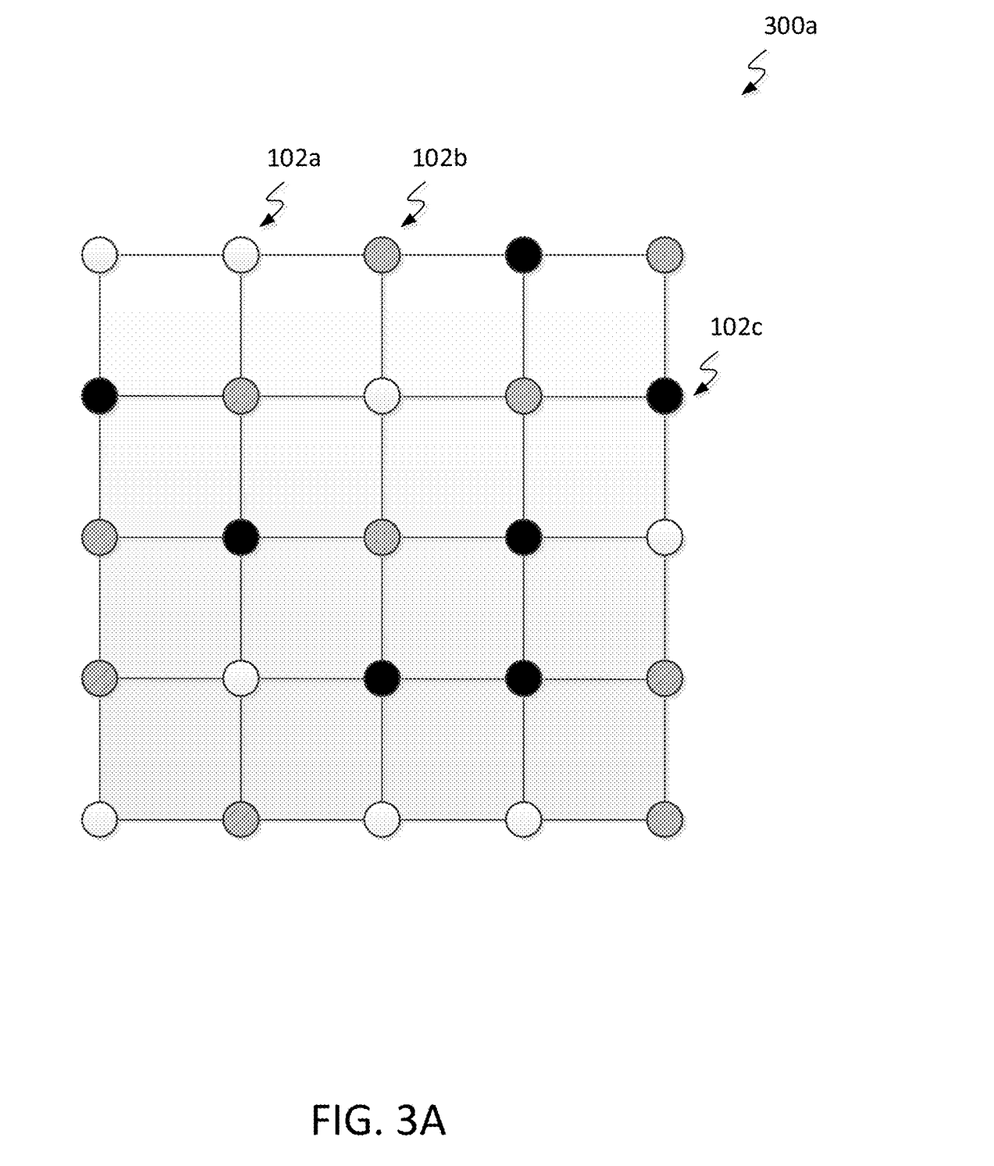
FIG. 3A is a block diagram of a plurality of luminaires in an indoor environment with uniquely identifiable subset groups of luminaires based on brightness or color in accordance an embodiment of the present disclosure.

In accordance with various embodiments of the present disclosure, there are a variety of methods for breaking the symmetry or repeating layout of a plurality of luminaires to create uniquely identifiable subset groupings of luminaires. One or more physical and/or optical properties of the luminaires may be changed. FIG. 3A includes a block diagram 300a illustrating one example method for breaking the symmetry or repeating layout of the plurality of luminaires 102 by varying the color and/or brightness of each luminaire randomly or in a non-repeating pattern. For example, luminaires 102a may be set to emit light of a first color or brightness (represented as clear circles), luminaires 102b may be set to emit light of a second color or brightness (represented as grey circles), and luminaires 102c may be set to emit light of a third color or brightness (represented as black circles).

The color and/or brightness of the luminaires 102 may be varied such each subset grouping of N luminaires is uniquely identifiable. For example, assuming N=9, each 3×3 matrix of luminaires in FIG. 3A is uniquely identifiable because none of the matrixes have the same layout of brightness/color. The number of different colors or brightness levels of the luminaires 102 may vary depending on the number of luminaires 102 in the indoor environment, the image capture capabilities of the computing device, and the value of N. The value of N may be chosen based a number of factors, such as the number of luminaires 102, the dimensions of the indoor environment, and the image capture capabilities of the computing device. For example, if the ceiling containing the luminaires is low or if the luminaires are spread out, then N should be lower in order for the computing device to capture at least N luminaires in one image. The variations in color and/or brightness may be subtle enough so that it is not noticeable to a human but may be detected by a computing device.

Figure 3B:
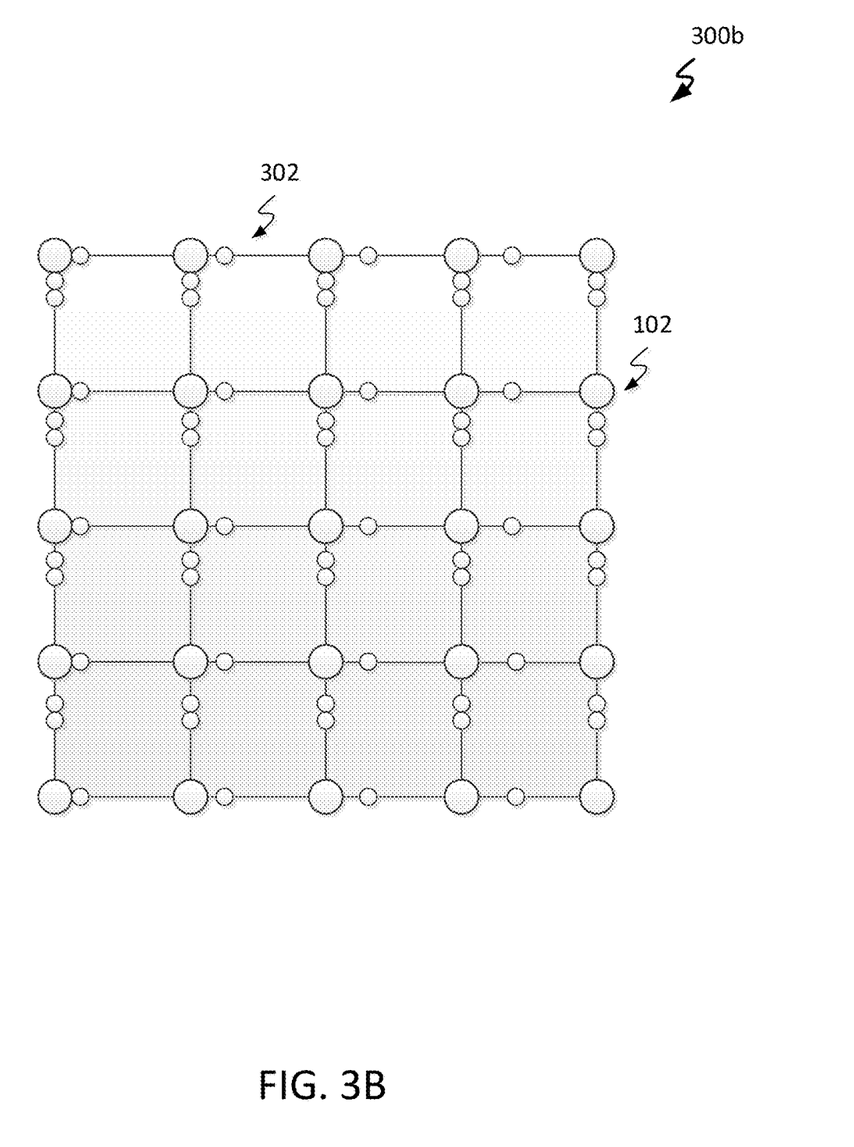
FIG. 3B is a block diagram of a plurality of luminaires in an indoor environment with uniquely identifiable subset groups of luminaires based on position in accordance an embodiment of the present disclosure.

If the position and orientation of the luminaires 102 is in a non-repeating layout, the computing device may be able to determine its position based on the position and orientation of a subset of luminaires. In the case of new construction, the luminaires 102 may be mounted in an irregular fashion. However, in existing indoor environments the luminaires 102 may already be fixed in a repeating layout and cannot be moved. FIG. 3B includes a block diagram 300b illustrating another example method for breaking the symmetry or repeating layout of the plurality of luminaires 102 by adding additional luminaires to produce a non-repeating pattern. For example, luminaires 302 may be added so that each subset grouping of N luminaires is uniquely identifiable. In one embodiment, the additional luminaires 302 may be embedded into strips that are placed between each of the luminaires 102. Each strip contains one or more luminaires, and the strips may be installed in such a way so that the repeating pattern of luminaires 102 is broken.

FIG. 3B illustrates one possible layout, but many layouts and implementations are possible for using additional luminaires 302 to break the symmetry or repeating layout of the existing luminaires 102. For example, two different types of strips may be used. A first type of strip may contain one luminaire or LED each, and the position of the LED on each consecutive strip may be shifted from left to right in increments of a pre-defined distance. These strips may be placed between the luminaires 102 along the X axis as shown in FIG. 3B. A second type of strip may contain two luminaires or LEDs each, located next to each other, and the position of the LED pair on each consecutive strip may be shifted from left to right in increments of a pre-defined distance. These strips may be placed between the luminaires 102 along the Y axis as shown in FIG. 3B. Each strip may be labeled with an axis and a sequence number according to the shift distance of the LED(s) in each strip. When these strips are applied to the luminaires 102, they create a non-repeating layout. In some embodiments, the LEDs on each strip may not shift half or more than a half of the distance between two neighboring luminaires 102 to ensure a non-repeating layout.

In another embodiment not illustrated in FIG. 3B, physical or optical markings or fiducials may be added to each luminaire 102 that are detectable by an image capture device of the computing device. For example, a marking (e.g., an arrow) may be placed on or proximate to each luminaire 102 in random orientations or rotations such that each subset grouping of luminaires 102 along with their markings is uniquely identifiable.

Figure 3C:
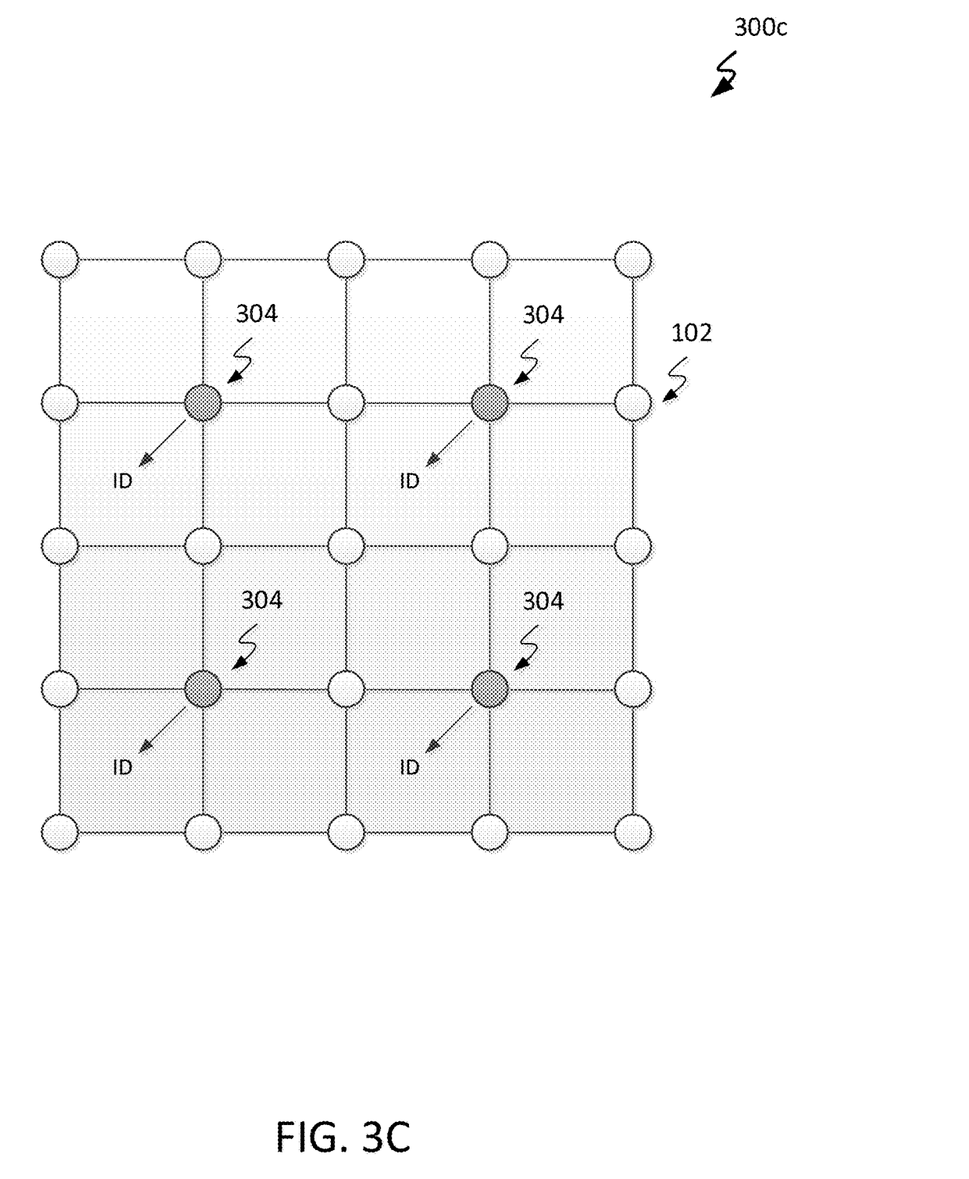
FIG. 3C is a block diagram of a plurality of luminaires in an indoor environment with uniquely identifiable subset groups of luminaires based on light-based communication in accordance an embodiment of the present disclosure.

FIG. 3C includes a block diagram 300c illustrating another example method for breaking the symmetry or repeating layout of the plurality of luminaires 102 by utilizing one or more LCom-enabled luminaires 304. Certain luminaires 304 may be replaced or retrofitted so that they are capable of transmitting LCom signals. The LCom-enabled luminaires 304 may be selected such that each subset grouping of N luminaires is uniquely identifiable from a unique identifier transmitted by each LCom-enabled luminaire 304. For example, assuming N=9, each 3×3 matrix of luminaires in FIG. 3C includes at least one LCom-enabled luminaire 304. The computing device may be able to uniquely identify any 3×3 matrix subset of luminaires from the unique identifier(s) received from at least one of the LCom-enabled luminaires 304 within the obtained image, as well as the relative position and orientation of each of the luminaires in the obtained image. The number of LCom-enabled luminaires 304 in the total number of luminaires 102 may depend on a number of factors, including the value of N, the total number of luminaires 102, and the distance from the luminaires 102 to the computing device.

In some embodiments, a combination of the approaches illustrated in FIGS. 3A-3C may be used in an indoor positioning system. For example, the luminaires 102 may be configured to emit light of varying brightness or color, and a portion of the luminaires 102 may be LCom-enabled luminaires 304 configured to transmit a unique identifier. The computing device may determine its own position based on the position, orientation, brightness/color of each luminaire 102 and 304, as well as the unique identifier(s) transmitted by the LCom-enabled luminaires 304. In another example, additional LCom-enabled luminaires 304 and non-LCom-enabled luminaires 302 may be added to the existing luminaires 102. The computing device may determine its own position based on the position and orientation of each luminaire 102, 302, and 304 as well as the unique identifier(s) transmitted by the LCom-enabled luminaires 304. In general, an indoor positioning system may utilize any one or a combination of varying the brightness and/or color of the luminaires 102, adding additional luminaires 302, using unique identifiers transmitted by LCom-enabled luminaires 304, and added markings to each luminaire 102 to determine the position of a computing device.

Example Indoor Positioning System Methods

Figure 4:
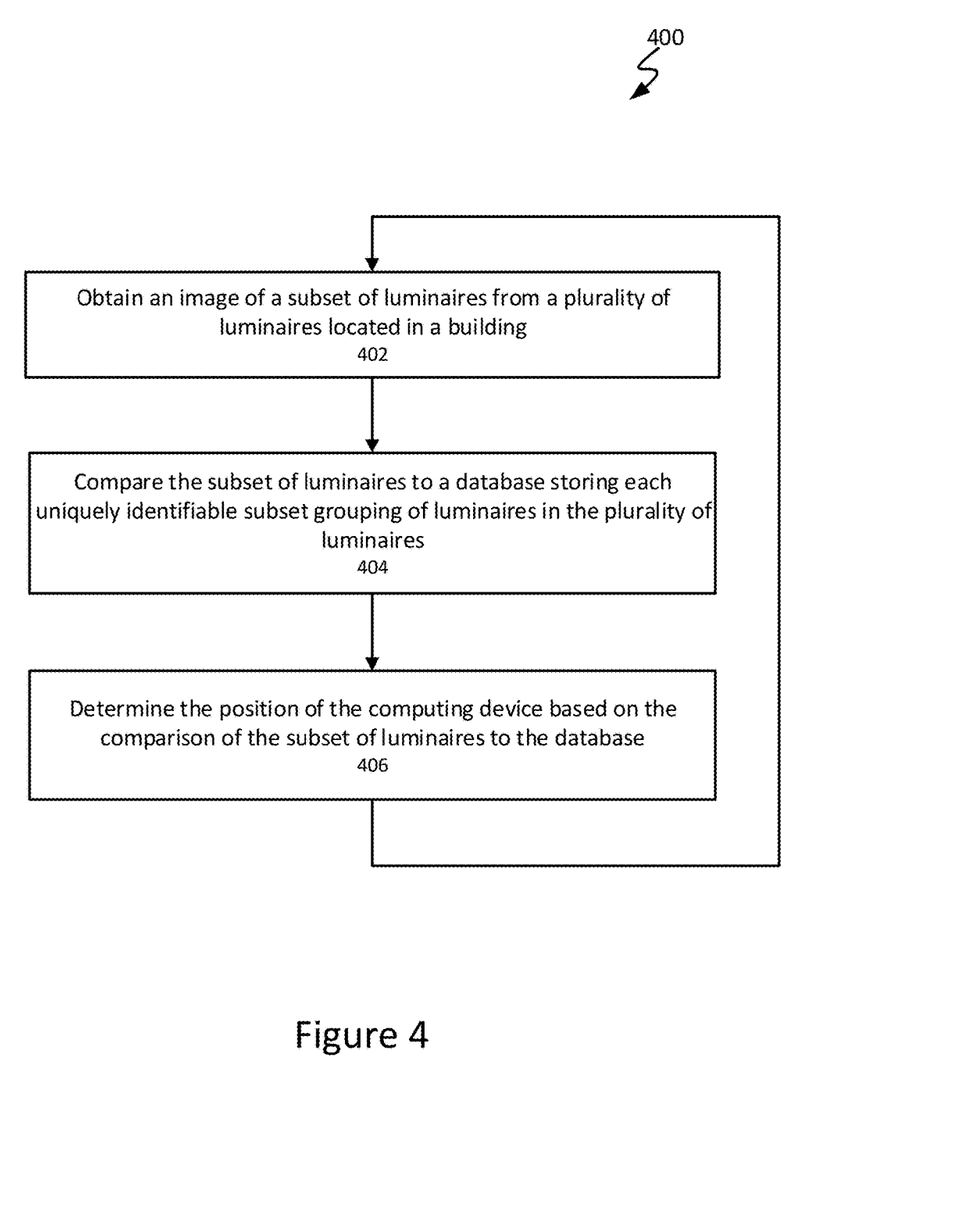
FIG. 4 is a flow chart of an example method for determining a position of a computing device in accordance with an embodiment of the present disclosure.

FIG. 4 is a flow chart of an example method 400 for determining the position of a computing device in accordance with an embodiment of the present disclosure. The method 400 may be performed by a computing device (e.g., computing device 104), or a combination of a computing device and a remote server (e.g., remote server 108). In block 402, the computing device may obtain an image of a subset of luminaires from a plurality of luminaires located in an indoor environment, such as a building. The computing device may have an image capture device, such as a camera or an ambient light sensor, which may be used to obtain an image of the subset of luminaires. For example, a user may point the image capture device on the computing device directly upward to take an image of a subset of luminaires above the computing device. The subset of luminaires may be considered a sub-constellation of the overall luminaire constellation constructed by all the luminaires in the indoor environment.

Each subset grouping of luminaires in the plurality of luminaires may be uniquely identifiable. The indoor positioning system may utilize one or more of the methods described with respect to FIGS. 3A-3C to ensure that each subset grouping of N luminaires in the plurality of luminaires is uniquely identifiable. Specifically, the plurality of luminaires may have varying color and/or brightness, additional luminaires may be added that break the repeating layout of the existing luminaires, non-symmetrical markings may be added to each luminaire, one or more of the luminaires may be LCom-enabled and transmit a unique identifier, or a combination of any of the above.

In some embodiments, the minimum number of luminaires in the obtained image should be three. This may give the computing device sufficient information to determine its own positioning. In some embodiments, if the computing device is tilted such that the image capture device is not pointing directly upward to obtain the image, the image may be transformed to remove the tilt effect. For example, the computing device may contain a gyroscopic sensor that can measure the tilting angle of the camera at the time the image was obtained. The tilting angle may be used in a birds-eye-view transformation of the obtained image to generate a corrected image that has no tilt (i.e., an image that is looking directly upward at the luminaires). The obtained image may also be calibrated or distortions removed using methods known in the art.

The computing device may use computer vision or image processing techniques to identify the subset of luminaires in the image. For example, the computing device may use blob detectors to identify the pixels in the image that correspond to light emitted by the luminaires. In some embodiments, not all the luminaires in the image may be identified. The computing device may identify at least N number of luminaires in the image, in which N is minimum number of luminaires used to determine the position of the computing device. In some embodiments, N may equal three.

The computing device may obtain a list of centers of each of the identified luminaires in the image. In some embodiments, the computing device may determine the X and Y coordinates of the center of each identified luminaire with respect to the image. For example, the image coordinate system may be in pixels, and the X and Y coordinates represent the pixel location in the image that correspond to the center of an identified luminaire. In some embodiments, the computing device may also determine the color and/or brightness of each identified luminaire through image analysis techniques. In some embodiments, the computing device may be configured to decode LCom signals from an identified luminaire that transmits a LCom signal. Various techniques for decoding LCom signals are known in the art.

In block 404, the computing device may compare the subset of luminaires to a database storing each uniquely identifiable subset grouping of luminaires in the plurality of luminaires. In some embodiments, the computing device may perform the comparison. In other embodiments, the computing device may send the image to a remote server to perform the comparison. This may be beneficial if it is not preferable for the computing device to store or have access to the database, which may contain sensitive data regarding the layout of the indoor environment.

The database may store information about the plurality of luminaires in the indoor environment. This information may be collected through a commissioning process. The database may store the X, Y, Z coordinate of each luminaire in the indoor environment. In some embodiments, the Z coordinate of each luminaire on the same floor of the indoor environment may be the same if the ceiling of each floor is flat. The coordinates may be in units or meters, feet, or other units of distance such that the coordinates represent the three dimensional coordinate for the luminaire. In some embodiments, the coordinates may be absolute, and in other embodiments the coordinates may be relative (e.g., relative to an origin spot in the indoor environment).

The database may also store additional information associated with each luminaire that may aid with indoor positioning. For example, the database may store the brightness and/or color attributes of each luminaire if each luminaire is configured to emit a different brightness and/or color. The database may store information about markings added to each luminaire. The database may store the unique identifier of certain luminaires that are LCom-enabled to transmit their own unique identifiers.

As part of the comparison in block 404, the computing device may identify a match between the subset of luminaires and one of the uniquely identifiable subset grouping of luminaires stored in the database. One such method of matching the relative positions and orientations of groups of luminaires is described below, but the present disclosure not limited to the described method. Generally, the matching may be performed in a number of ways known in the art of pattern matching, and variations to the method described below are also contemplated.

The computing device may generate a list of all possible triangles formed by any three luminaires in the subset of luminaires in the obtained image. The vertices of each triangle may correspond to the coordinates of the centers of the luminaires in the triangle. Each triangle may have the vertices listed in a certain order as vertex 1, vertex 2, and vertex 3. The vertices are arranged in order such that the side between vertices 1 and 2 is the shortest side, the side between vertices 2 and 3 is the intermediate side, and the side between vertices 1 and 3 is the longest side. The list may also contain the traverse of the three vertices (either clockwise or counterclockwise), the ratio of the longest side to the shortest side, a tolerance value for the ratio, the cosine of the angle at vertex 1 (assuming all angles measured between 0 and 180 degrees), and a tolerance value for the cosine.

A similar list of triangles is generated for all neighboring luminaires stored in the database. The triangles may be generated for luminaires in the same room and/or on the same floor, but not for luminaires that span rooms or floors. In some embodiments, the list of triangles is pre-calculated and stored in the database so that it does not need to be generated every time. The list of triangles of the subset of luminaires in the obtained image (list "A"), and the list of triangles of all the luminaires in the indoor environment (list "B"), may be sorted based on the increasing ratio of longest side to shortest side.

A matching process is applied to both lists of triangles. The goal of the matching is to identify the matching pairs of triangles from both lists. This in turn helps to identify matching subsets of luminaires in the obtained image and the database. In the matching process, a triangle from list A is compared to a triangle in list B. If the distance/difference between the two ratios of the longest side to the shortest side is within a certain tolerance value (as specified in the lists), and the distance/difference between the two cosine values of the angles at vertex 1 for both triangles is also within a certain tolerance (as specified in the lists), the two triangles may be a match. The computing device may then compare the clockwise and/or counterclockwise orientations of the two triangles. If the orientations are the same, then the two triangles may be considered a true match. If there is no match, the computing device may compare the triangle from list A with another triangle in list B. Because the lists are sorted, the number of comparisons between triangles are reduced: successive triangles selected from list A are compared with a relatively small number of triangles from list B.

If the luminaires are configured to emit light of different brightness and/or color, the computing device may also compare the brightness/color of each luminaire in both triangles. If the relative position and orientation of the triangles match but the brightness/color does not match, then the two triangles are not considered a true match. If the triangles match in all respects, then the triangles are considered a true match.

If the luminaires also have special markings, the computing device may also compare the relative position and orientation of each marking in both triangles. If the relative position and orientation of the triangles match but the relative position and orientation of the markings do not match, then the two triangles are not considered a true match. If the triangles match in all respects, then the triangles are considered a true match.

If some of the luminaires are LCom-enabled, the computing device may also compare the unique identifier(s) decoded from the obtained image to the unique identifier(s) of the triangles in the database. If the relative position and orientation of the triangles match but the unique identifier(s) do not match, then the two triangles are not considered a true match. If the triangles match in all respects, then the triangles are considered a true match.

Once all the triangles from list A are matched to their counterparts in list B, the computing device may identify the matched subset grouping of luminaires in the database that correspond to the subset of luminaires in the obtained image. The computing device may obtain the position information of each of the luminaires in the matched subset grouping of luminaires from the database.

In block 406, the computing device may determine the position of the computing device based on the comparison of the subset of luminaires to the database. The database stores the position information of each luminaire in the matched subset grouping of luminaires. The computing device may utilize computer vision or image processing techniques to calculate the rotation, translation, and inversions from the image capture device coordinate system to the physical world coordinate system. In some embodiments, the computing device may first determine the relative position of the computing device with respect to the subset of luminaires based on the obtained image. The computing device may then determine the absolute position of the computing device based on the relative position and the position information of the subset of luminaires stored in the database. The absolute position may include three dimensional coordinates for the computing device in the real world. In some embodiments, the absolute position may also include the pitch, roll, and yaw of the computing device (i.e., the absolute position includes six degrees of freedom). Methods for determining the pitch, roll, and yaw of the computing device are known in the art.

Thus using the relative position and orientation of the subset of luminaires in the obtained image and the real world position information of the subset of luminaires from the database, the position of the computing device may be obtained. In some embodiments, a remote server (e.g., remote server 108) that received the image from the computing device may determine the position of the computing device and send the position information back to the computing device. The method 400 may then be repeated as the computing device moves through the indoor environment (i.e., return to block 402 after block 406). In this manner, the method 400 provides a way to implement an indoor positioning system when none or only a subset of luminaires are LCom-enabled.

Further Considerations

Figure 5:
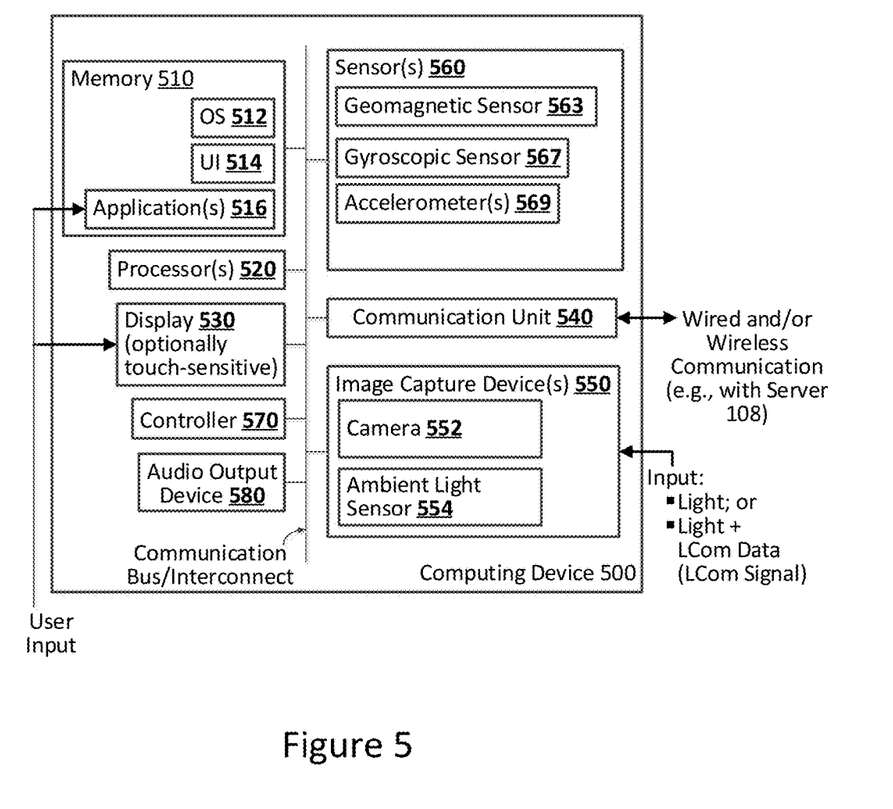
FIG. 5 is a block diagram illustrating a computing device configured in accordance with an embodiment of the present disclosure.

FIG. 5 illustrates an example computing device 500 configured in accordance with various embodiments of the present disclosure. Computing device 500 may be similar to computing device 104 in FIG. 1. As discussed herein, computing device 500 may be configured, in accordance with some embodiments: (1) to determine its own position from an obtained image of a subset of luminaires; and/or (2) to detect and decode the light pulses of an LCom signal transmitted by a LCom-enabled luminaire. To these ends, computing device 500 can be any of a wide range of computing platforms, mobile or otherwise. For example, in accordance with some embodiments, computing device 500 can be, in part or in whole: (1) a laptop/notebook computer or sub-notebook computer; (2) a tablet or phablet computer; (3) a mobile phone or smartphone; (4) a personal digital assistant (PDA); (5) a portable media player (PMP); (6) a cellular handset; (7) a handheld gaming device; (8) a gaming platform; (9) a desktop computer; (10) a television set; (11) a wearable or otherwise body-borne computing device, such as a smartwatch, smart glasses, or smart headgear; and/or (12) a combination of any one or more thereof. Other suitable configurations for computing device 500 will depend on a given application and will be apparent in light of this disclosure.

As can be further seen from FIG. 5, computing device 500 may include memory 510 and one or more processors 520. Memory 510 can be of any suitable type (e.g., RAM and/or ROM, or other suitable memory) and size, and in some cases may be implemented with volatile memory, non-volatile memory, or a combination thereof. A given processor 520 of computing device 500 may be configured as typically done, and in some embodiments may be configured, for example, to perform operations associated with computing device 500 and one or more of the components thereof (e.g., within memory 510 or elsewhere). In some cases, memory 510 may be configured to be utilized, for example, for processor workspace (e.g., for one or more processors 520) and/or to store media, programs, applications, and/or content on computing device 500 on a temporary or permanent basis. The one or more components stored in memory 510 (e.g., such as operating system (OS) 512, user interface (UI) 514, and/or one or more applications 516) can be accessed and executed, for example, by the one or more processors 520 of computing device 500. In some embodiments, the memory 510 of the computing device 500 may store a database of information about each luminaire in an indoor environment. The processor 520 may compare an obtained image of a subset of luminaires to the database to determine the position of the computing device 500.

OS 512 can be implemented with any suitable OS, mobile or otherwise, such as, for example: (1) Android OS from Google, Inc.; (2) iOS from Apple, Inc.; (3) BlackBerry OS from BlackBerry Ltd.; (4) Windows Phone OS from Microsoft Corp; (5) Palm OS/Garnet OS from Palm, Inc.; (6) an open source OS, such as Symbian OS; and/or (7) a combination of any one or more thereof. Suitable configurations and capabilities for OS 512 will depend on a given application and will be apparent in light of this disclosure. A user interface (UI) 514 is provided as commonly done, and generally allows for user interaction with the device 500 (e.g., such as a graphical touched-based UI on various smartphones and tablets). Any number of user interface schemes can be used.

In accordance with some embodiments, memory 510 may have stored therein (or otherwise have access to) one or more applications 516. In some instances, computing device 500 may be configured to receive input, for example, via one or more applications 516 stored in memory 510 (e.g., such as an indoor navigation application). In accordance with some embodiments, a given application 516 can be implemented in any suitable standard and/or custom/proprietary programming language, such as, for example: (1) C; (2) C++; (3) objective C; (4) JavaScript; and/or (5) any other suitable custom or proprietary instruction sets. In a more general sense, the applications 516 can be instructions encoded on any suitable non-transitory machine-readable medium that, when executed by one or more processors 520, carries out functionality of a given computing device 500, in part or in whole. In one example embodiment, one of the applications 516 is a routine programmed or otherwise configured to determine the position of the computing device 500 from an obtained image of a subset of luminaires. At least one of the applications 516 may also be configured to decode LCom signals received by the computing device 500.

As can be seen further from FIG. 5, computing device 500 may include a display 530, in accordance with some embodiments. Display 530 can be any electronic visual display or other device configured to display or otherwise generate an image (e.g., image, video, text, and/or other displayable content) there at. In some instances, display 530 may be integrated, in part or in whole, with computing device 500, whereas in some other instances, display 530 may be a stand-alone component configured to communicate with computing device 500 using any suitable wired and/or wireless communications means. In some cases, display 530 optionally may be a touchscreen display or other touch-sensitive display. To that end, display 530 may utilize any of a wide range of touch-sensing techniques, such as, for example: (1) resistive touch-sensing; (2) capacitive touch-sensing; (3) surface acoustic wave (SAW) touch-sensing; (4) infrared (IR) touch-sensing; (5) optical imaging touch-sensing; and/or (6) a combination of any one or more thereof. In a more general sense, and in accordance with some embodiments, an optionally touch-sensitive display 530 generally may be configured to detect or otherwise sense direct and/or proximate contact from a user's finger, stylus, or other suitable implement at a given location of that display 530. In some cases, an optionally touch-sensitive display 530 may be configured to translate such contact into an electronic signal that can be processed by computing device 500 (e.g., by the one or more processors 520 thereof) and manipulated or otherwise used to trigger a given UI action. In some cases, a touch-sensitive display 530 may facilitate user interaction with computing device 500 via the UI 514 presented by such display 530. Numerous suitable configurations for display 530 will be apparent in light of this disclosure.

In accordance with some embodiments, computing device 500 may include a communication unit 540, which may be configured for wired (e.g., Universal Serial Bus or USB, Ethernet, FireWire, etc.) and/or wireless (e.g., Wi-Fi, Bluetooth, etc.) communication using any suitable wired and/or wireless transmission technologies (e.g., radio frequency, or RF, transmission; infrared, or IR, light modulation; etc.), as desired. In accordance with some embodiments, communication unit 540 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; (6) a near field communication (NFC) protocol; (7) a local area network (LAN)-based communication protocol; (8) a cellular-based communication protocol; (9) an Internet-based communication protocol; (10) a satellite-based communication protocol; and/or (11) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication unit 540, as desired for a given target application or end-use. In some instances, communication unit 540 may be configured to communicate with one or more LCom-enabled luminaires. Numerous suitable configurations for communication unit 540 will depend on a given application and will be apparent in light of this disclosure.

Also, as can be seen from FIG. 5, computing device 500 may include one or more image capture devices 550, such as a camera 552 and/or an ambient light sensor 554, in accordance with some embodiments. The camera 552 may be one or more of a front-facing camera or a rear-facing camera. The ambient light sensor 554 may be configured as typically done, and in some example embodiments may be configured to detect and measure ambient light levels in the surrounding environment of the host computing device 500. For consistency and ease of understanding of the present disclosure, camera 552 and ambient light sensor 554 hereinafter may be collectively referred to generally as an image capture device 550, except where separately referenced. A given image capture device 550 can be any device configured to capture digital images, such as a still camera (e.g., a camera configured to capture still photographs) or a video camera (e.g., a camera configured to capture moving images including a plurality of frames). In some cases, a given image capture device 550 may include typical components such as, for instance, an optics assembly, an image sensor, and/or an image/video encoder, and may be integrated, in part or in whole, with computing device 500. A given image capture device 550 can be configured to operate using light, for example, in the visible spectrum and/or other portions of the electromagnetic spectrum not limited to the infrared (IR) spectrum, ultraviolet (UV) spectrum, etc. In some instances, a given image capture device 550 may be configured to continuously acquire imaging data. As described herein, a given image capture device 550 of computing device 500 may be configured, in accordance with some embodiments, to detect the light and/or LCom signal output of a transmitting LCom-enabled luminaire. In some instances, a given image capture device 550 may be, for example, a camera like one typically found in smartphones or other mobile computing devices. Numerous other suitable configurations for a given image capture device 550 of computing device 500 will depend on a given application and will be apparent in light of this disclosure.

In accordance with some embodiments, computing device 500 may include one or more sensors 560. In some embodiments, computing device 500 optionally may include a geomagnetic sensor 563. When included, geomagnetic sensor 563 may be configured as typically done, and in some example embodiments may be configured to determine the orientation and/or movement of a host computing device 500 relative to a geomagnetic pole (e.g., geomagnetic north) or other desired heading, which may be customized as desired for a given target application or end-use. In some embodiments, computing device 500 optionally may include a gyroscopic sensor 567. When included, gyroscopic sensor 567 may be configured as typically done, and in some example embodiments may be configured to determine the orientation (e.g., roll, pitch, and/or yaw) of the host computing device 500. In some embodiments, computing device 500 optionally may include an accelerometer 569. When included, accelerometer 569 may be configured as typically done, and in some example embodiments may be configured to detect motion of the host computing device 500. In any case, a given sensor 560 of a given host computing device 500 may include mechanical and/or solid-state componentry, as desired for a given target application or end-use. Also, it should be noted that the present disclosure is not so limited only to these example optional sensors 560, as additional and/or different sensors 560 may be provided, as desired for a given target application or end-use, in accordance with some other embodiments. Numerous sensor configurations for device 500 will be apparent in light of this disclosure.

In accordance with some embodiments, computing device 500 may include or otherwise be communicatively coupled with one or more controllers 570. A given controller 570 may be configured to output one or more control signals to control any one or more of the various components of computing device 500 and may do so, for example, based on wired and/or wireless input received from a given local source (e.g., such as on-board memory 510) and/or remote source (e.g., such as a control interface, remote server 108, etc.). In accordance with some embodiments, a given controller 570 may host one or more control units and can be programmed or otherwise configured to output one or more control signals, for example, to adjust the operation of a given portion of computing device 500. For example, in some cases, a given controller 570 may be configured to output a control signal to control operation of a given image capture device 550, and/or to output a control signal to control operation of one or more sensors 560. Numerous other configurations and control signal output for a given controller 570 of computing device 500 will depend on a given application and will be apparent in light of this disclosure.

As can be seen further from FIG. 5, computing device 500 may include an audio output device 580, in accordance with some embodiments. Audio output device 580 can be, for example, a speaker or any other device capable of producing sound from an audio data signal, in accordance with some embodiments. Audio output device 580 can be configured, for example, to reproduce sounds local to and/or received by its host computing device 500. In some instances, audio output device 580 may be integrated, in part or in whole, with computing device 500, whereas in some other instances, audio output device 580 may be a stand-alone component configured to communicate with computing device 500 using any suitable wired and/or wireless communications means, as desired. Numerous other suitable types and configurations for audio output device 580 will depend on a given application and will be apparent in light of this disclosure.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

What is claimed is:

1. A method for determining the position of a computing device, the method comprising:

obtaining, by the computing device, an image of a subset of luminaries from a plurality of luminaires located in an indoor environment, wherein each subset grouping of luminaires in the plurality of luminaires is uniquely identifiable;

comparing the subset of luminaires to a database storing each uniquely identifiable subset grouping of luminaires in the plurality of luminaires, wherein the database includes position information for each luminaire in the plurality of luminaires; and determining the position of the computing device based on the comparison of the subset of luminaires to the database.

2. The method of claim 1, wherein each subset grouping of luminaires in the plurality of luminaires is uniquely identifiable based at least in part on a position, orientation, brightness, or color of each luminaire, or a marking on or proximate to each luminaire.

3. The method of claim 2, wherein the database stores the brightness or color of each luminaire in the plurality of luminaires and information about the marking of each luminaire.

4. The method of claim 1, the method further comprising:

decoding a unique identifier of a first luminaire in the subset of luminaires, the first luminaire transmitting the unique identifier via light-based communication;

determining the position of the computing device based at least in part on the unique identifier, wherein the database stores the unique identifier for the first luminaire.

5. The method of claim 1, wherein the subset of luminaires contains at least N number of luminaires and each subset grouping of N luminaires in the plurality of luminaires is uniquely identifiable.

6. The method of claim 1, wherein comparing the subset of luminaires to the database comprises:

identifying a match between the subset of luminaires and one of the uniquely identifiable subset grouping of luminaires stored in the database; and obtaining the position information of each of the luminaires in the matched subset grouping of luminaires from the database;

wherein determining the position of the computing device is based on the position information of each of the luminaires in the matched subset grouping of luminaires.

7. The method of claim 1, wherein determining the position of the computing device comprises:
   determining a relative position of the computing device with respect to the subset of luminaires based on the obtained image; and
   determining an absolute position of the computing device based on the relative position of the computing device and position information of the subset of luminaires stored in the database.

8. The method of claim 7, wherein the absolute position of the computing device comprises a three dimensional location, a pitch, a roll, and a yaw of the computing device.

9. A computing device, comprising:
   an image capture device configured to obtain an image of a subset of luminaires from a plurality of luminaires located in an indoor environment, wherein each subset grouping of luminaires in the plurality of luminaires is uniquely identifiable; and
   a processor configured to:
      compare the subset of luminaires to a database storing each uniquely identifiable subset grouping of luminaires in the plurality of luminaires, wherein the database includes position information for each luminaire in the plurality of luminaires; and
      determine the position of the computing device based on the comparison of the subset of luminaries to the database.

10. The computing device of claim 9, wherein each subset grouping of luminaires in the plurality of luminaires is uniquely identifiable based at least in part on a position, orientation, brightness, or color of each luminaire, or a marking on or proximate to each luminaire.

11. The computing device of claim 10, wherein the database stores the brightness or color of each luminaire in the plurality of luminaires and information about the marking of each luminaire.

12. The computing device of claim 9, wherein the processor is further configured to:
   decode a unique identifier of a first luminaire in the subset of luminaires, the first luminaire transmitting the unique identifier via light-based communication;
   determine the position of the computing device based at least in part on the unique identifier, wherein the database stores the unique identifier for the first luminaire.

13. The computing device of claim 9, wherein the subset of luminaires contains at least N number of luminaires and each subset grouping of N luminaires in the plurality of luminaires is uniquely identifiable.

14. The computing device of claim 9, wherein the processor is configured to compare the subset of luminaires to the database by:
   identifying a match between the subset of luminaires and one of the uniquely identifiable subset grouping of luminaires stored in the database; and
   obtaining the position information of each of the luminaires in the matched subset grouping of luminaires from the database;
   wherein determining the position of the computing device is based on the position information of each of the luminaires in the matched subset grouping of luminaires.

15. The computing device of claim 9, wherein the processor is configured to determine the position of the computing device by:
   determining a relative position of the computing device with respect to the subset of luminaires based on the obtained image; and
   determining an absolute position of the computing device based on the relative position of the computing device and position information of the subset of luminaires stored in the database.

16. The computing device of claim 15, wherein the absolute position of the computing device comprises a three dimensional location, a pitch, a roll, and a yaw of the computing device.

17. A system comprising the computing device of claim 8 and further comprising a remote server, wherein:
   the remote server is configured to compare the subset of luminaires to the database and determine the position of the computing device; and
   the computing device is further configured to transmit the image of the subset of luminaires to the remote server and receive the position of the computing device from the remote server.

18. A non-transitory processor-readable storage medium having stored thereon processor-executable instructions configured to cause a processor of a computing device to perform operations comprising:
   obtaining an image of a subset of luminaires from a plurality of luminaires located in an indoor environment, wherein each subset grouping of luminaires in the plurality of luminaires is uniquely identifiable;
   comparing the subset of luminaires to a database storing each uniquely identifiable subset grouping of luminaires in the plurality of luminaires, wherein the database includes position information for each luminaire in the plurality of luminaires; and
   determining the position of the computing device based on the comparison of the subset of luminaries to the database.

19. The non-transitory processor-readable storage medium of claim 18, wherein each subset grouping of luminaires in the plurality of luminaires is uniquely identifiable based at least in part on a position, orientation, brightness, or color of each luminaire, or a marking on or proximate to each luminaire.

20. The non-transitory processor-readable storage medium of claim 18, wherein the stored processor-executable instructions are configured to cause the processor to perform operations further comprising:
   decoding a unique identifier of a first luminaire in the subset of luminaires, the first luminaire transmitting the unique identifier via light-based communication;
   determining the position of the computing device based at least in part on the unique identifier, wherein the database stores the unique identifier for the first luminaire.

21. The non-transitory processor-readable storage medium of claim 18, wherein the subset of luminaires contains at least N number of luminaires and each subset grouping of N luminaires in the plurality of luminaires is uniquely identifiable.

22. The non-transitory processor-readable storage medium of claim 18, wherein the stored processor-executable instructions are configured to cause the processor to perform operations such that comparing the subset of luminaires to the database comprises:

identifying a match between the subset of luminaires and one of the uniquely identifiable subset grouping of luminaires stored in the database; and obtaining the position information of each of the luminaires in the matched subset grouping of luminaires from the database;

wherein determining the position of the computing device is based on the position information of each of the luminaires in the matched subset grouping of luminaires.

23. The non-transitory processor-readable storage medium of claim 18, wherein the stored processor-executable instructions are configured to cause the processor to perform operations such that determining the position of the computing device comprises:

determining a relative position of the computing device with respect to the subset of luminaires based on the obtained image; and determining an absolute position of the computing device based on the relative position of the computing device and position information of the subset of luminaires stored in the database.

* * * * *